Dec. 3, 1968   J. BARRON ET AL   3,414,882
ELECTRICAL SWITCHING MATRICES
Filed April 21, 1965   3 Sheets-Sheet 1

INVENTORS
JOHN BARRON
VICTOR ANDREW JOHN MALLER

ATTORNEYS

United States Patent Office 3,414,882
Patented Dec. 3, 1968

3,414,882
ELECTRICAL SWITCHING MATRICES
John Barron, Cambridge, and Victor Andrew John Maller, Stotfold, England, assignors to International Computers and Tabulators Limited, London, England, a British company
Filed Apr. 21, 1965, Ser. No. 449,718
Claims priority, application Great Britain, May 8, 1964, 19,369/64
6 Claims. (Cl. 340—166)

ABSTRACT OF THE DISCLOSURE

It is well known that switching cells in a continuous medium, such as in superconductive devices, for example, Crow cells, or in electro-optical crystals of, for example, barium titanate, may be formed and/or controlled by proportional electrical signals applied to conductors linked with an array of selected areas of the medium. Hitherto, in switching matrices of such cells, the conductor configuration required for controlling the selection of a specific area out of many has necessitated the constant reorientation of at least one of the conductors as it passes across the array, with the result that a considerable part of the length of this conductor is devoted to this reorientation rather than to the actual switching control of cells in the array. The present proposals show how, by arranging the positions of cells in the array along the sides of notional rectilinear geometrical figures, a conductor configuration may be employed in which all the selection conductors consist of linear sections, each lying at an angle to its neighbours, so that each section is linked with a different cell. The combined effect of all the conductors is to produce a pattern of rectilinear geometrical figures over the medium, in which each side of each of the figures is associated with a unique pair of selection conductors.

---

Figure 1:
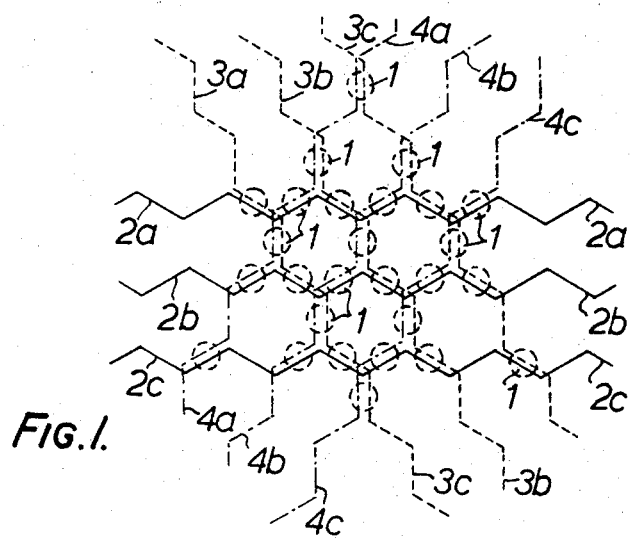

The present invention relates to electrical switching matrices and in particular to selecting arrangements for such matrices.

Electrical switching matrices have previously been proposed and, for example, may consist of a planar sheet of suitable material having appropriate switching characteristics. Individual switching cells are then formed in matrix array by the application of a suitable pattern of electrical conductors to one or both faces of the sheet. These conductors may be regarded as consisting of groups of co-acting selection lines. One particular form of an electrical switching matrix using this arrangement for the selection of an individual switching cell is described in a paper entitled "Coincident-Current Superconductive Memory," by L. L. Burns, Jr., et al.; published in the I.R.E. Transactions on Electronic Computers, volume EC-10, Number 3, of September 1961, by the Institute of Radio Engineers, Inc., of New York, U.S.A. The matrix described therein comprises an array of information storage cells which are defined by the crossing points of orthogonal conductors and which are operated by the selection of appropriate ones of these conductors for energisation by electrical currents. Thus, in this example, the selection lines are the two groups of orthogonal conductors and the switching cells are the memory cells defined in this manner. Other known forms of switching cells are, for example, cryotron gating devices such as are described, for example, in a paper entitled "The In-Line Cryotron," by A. E. Brennemann, published in Proceedings of the IEEE, volume 51, Number 3, for March 1963, by the Institute of Electrical and Electronic Engineers, Inc., of New York, U.S.A. In this case the cells are each defined and actuated by a pair of parallel selection lines.

Such known matrices of switching cells each actuated respectively by a pair of co-acting selection lines have previously used two groups of mutually interacting conductors arranged generally at right-angles across the sheet; the so-called orthogonal selection system, in which a particular individual cell is uniquely selected by the selection of the two conductors, one from each group, associated with it. This arrangement is ideally suited for use with cells which are each controlled by a pair of mutually perpendicular conductors. However, complications arise where it is required that the pair of selection lines for a single cell are required to pass across the cell in parallel formation. In such cases it has previously been proposed to arrange the selection line pattern so that the selection lines of the first group pass in straight lines across the switching cell array while those of the second group assume a castellated form so that for each row of cells the associated selection line of the second group passes across one cell parallel to a conductor of the first group and is then turned through a right angle to approach the next conductor of the first group, where it is again turned through a right-angle to pass back across the next cell of the row. An arrangement of selection lines in this manner is seen, for example, in a paper entitled "A Proposal for a Fast Random-Access Computer Store Based on the Superconducting Device Known as the 'Crow Cell'," by J. M. Lock et al., published in "Solid State Electronics," for September–October 1962, by Pergamon Press. It will be seen that because the selection lines of the second group are re-orientated in this manner, a considerable part of the total length of each line is used merely to link the operational parts of the line and takes no part in the operation of the devices. In other words, the packing density of switching cells along this line is very much reduced relative to the total length of the line. A further complication arises because the line passes back and forth across the cells of the row, the direction of flow of a current in the line being in reverse sense relative to adjacent cells of the row. Thus, where, for example, the currents in the pair of selection lines associated with a single cell are required to flow in the same direction relative to the cell, the polarity of the currents in the selection lines of the first group must be reversed in adjacent lines.

It is an object of the present invention to provide an improved arrangement of groups of selection lines for an electrical switching matrix in which the linking portions of selecting lines are reduced relative to the total lengths of the lines.

It is a further object of the invention to provide an improved selection arrangement for an electrical switching matrix having a plurality of groups of selection lines.

In accordance with the invention the selection arrangement for an electrical switching matrix includes at least three mutually interacting groups of selection lines arranged to form a pattern over the switching cells of the matrix, which pattern comprises a plurality of closed rectilinear geometrical figures, the sides of the figures each lying adjacent to a different switching cell, the pattern being arranged so that two co-acting selection lines respectively from different groups lie in substantially parallel relationship along each one of said sides, whereby each of said cells is uniquely selectable by the selection of a different pair of selection lines, one from each of two different groups respectively.

Figure 2:
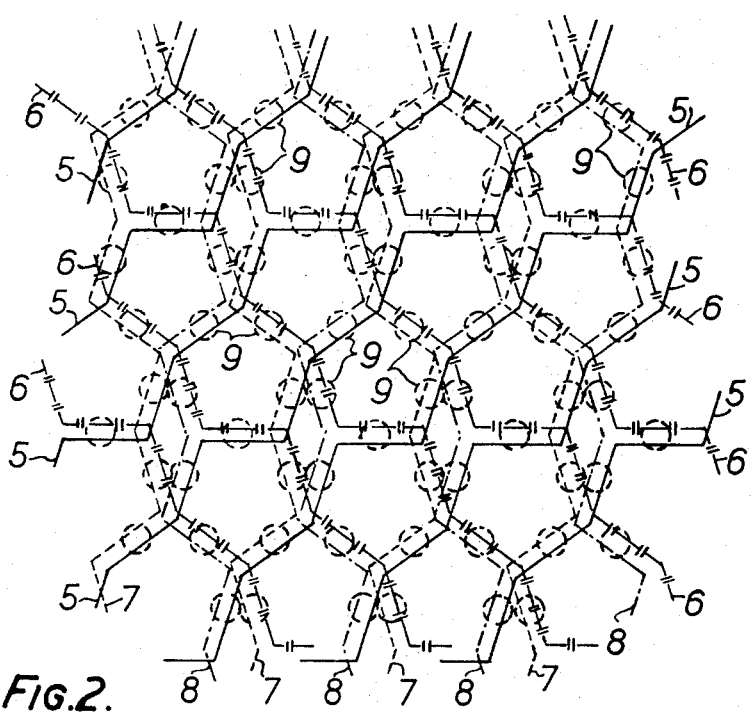
Figure 3:
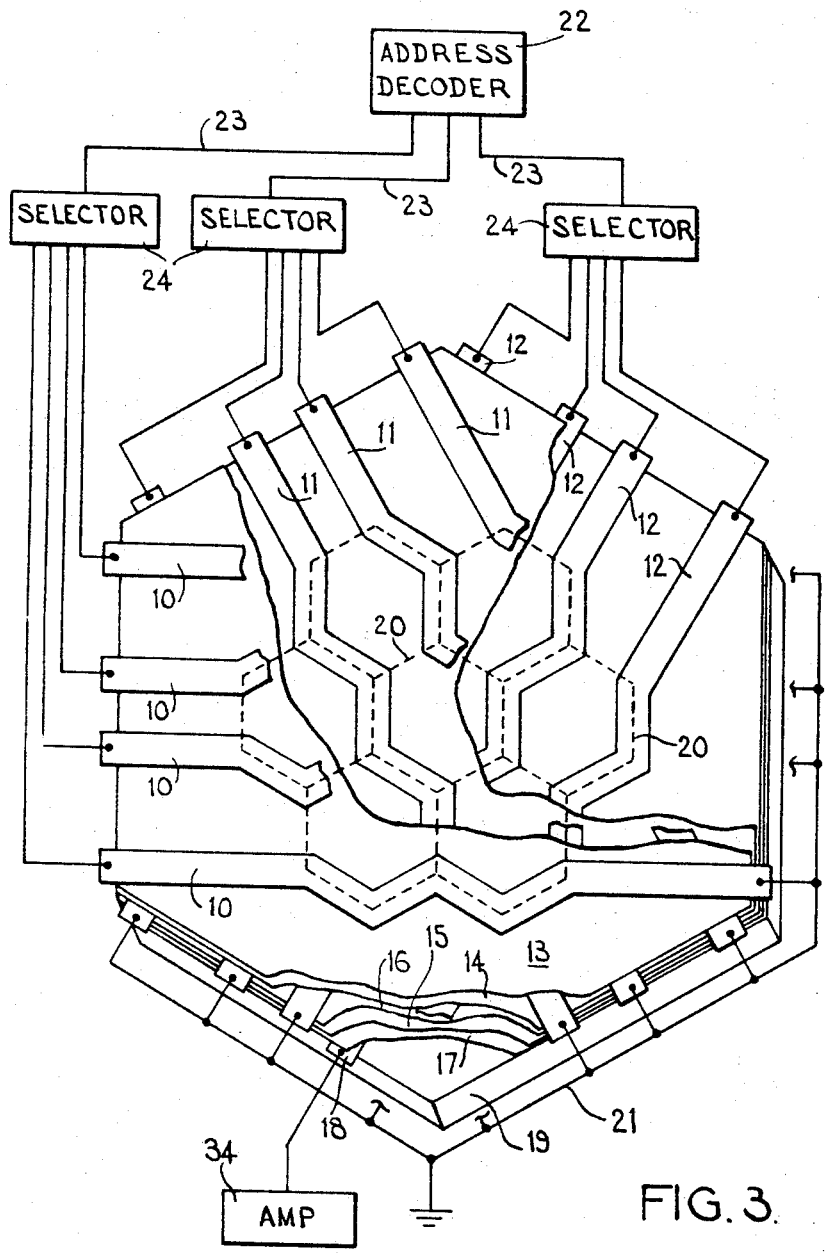
Figure 4:
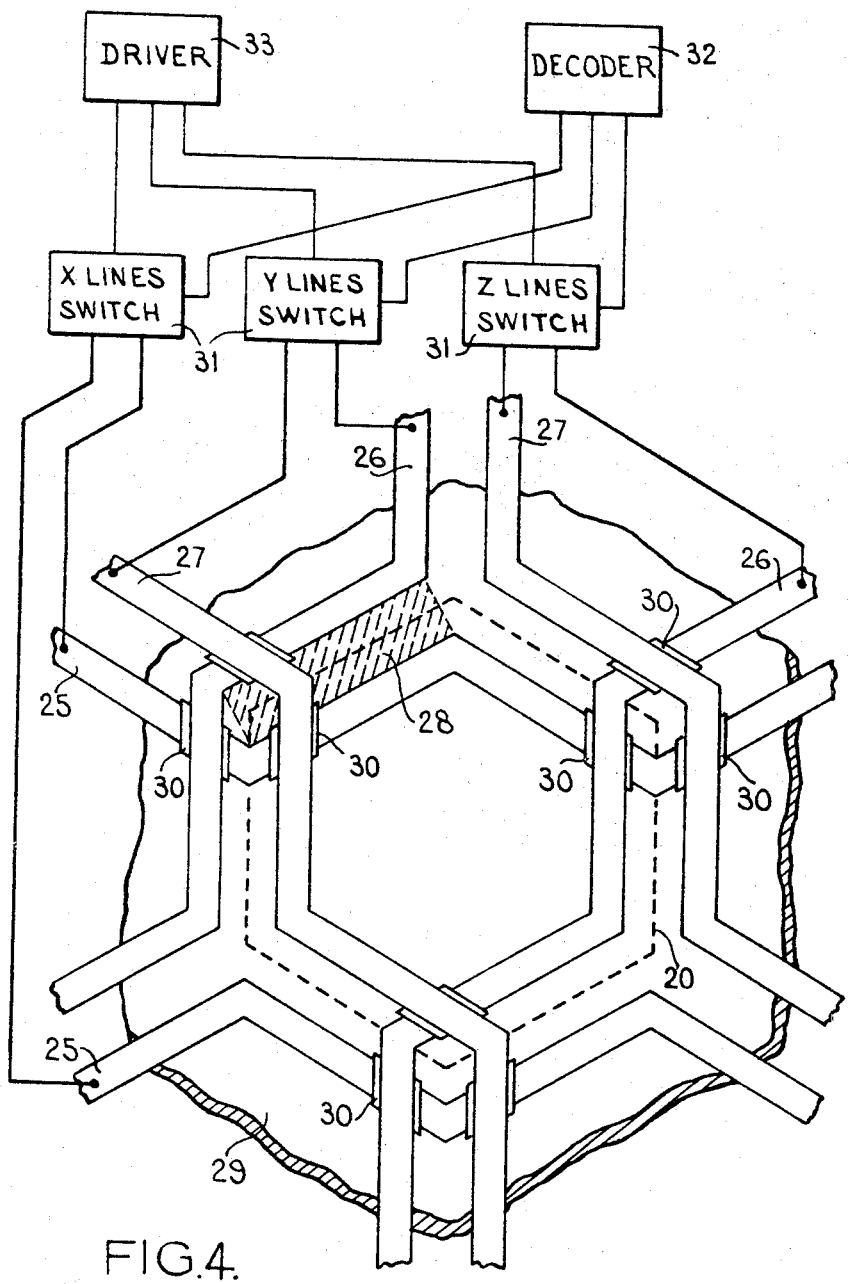

Apparatus embodying the present invention will now be described, by way of example, with reference to the accompanying drawings in which, FIGURE 1 shows diagrammatically the arrangement of selection lines for a matrix of switching cells, FIGURE 2 shows, in diagrammatic form, an alternative arrangement, FIGURE 3 shows an electrical switching matrix, and FIGURE 4 shows a part of an alternative arrangement of a switching matrix.

FIGURE 1 represents a pattern formed by three groups of selection lines suitable for application to a planar matrix of switching cells. In the figure, the positions of switching cells in the matrix are schematically indicated by dotted circles 1. It will be appreciated that the circles are intended merely to indicate the relative positions of the cells in the matrix array and not the actual size or shape of the individual cells.

Three groups of selection lines 2, 3, 4, pass across the array of cells. For the sake of clarity only three lines are shown in each group and these lines are respectively additionally referenced with a suffix *a*, *b*, or *c* to facilitate identification. Each selection line has a number of linear portions and the lines zig-zag across the pattern so that each linear portion of a line lies parallel to a linear portion of a different other line. For example, consider the line 2*a* as it passes from left to right in the figure. The first effective linear portion, as shown in the figure, is that which lies parallel to a portion of the line 3*a*. The adjacent linear portion of the line 2*a* lies parallel to a portion of line 4*a*, the next lies parallel to a portion of line 3*b* and so on. The arrangement of all the selection lines in this manner produces, as may be seen in the figure, a pattern of regular hexagons overlying the array of switching cells. Six complete hexagons are shown in the drawing and it will be appreciated that as a greater number of selection lines are used, so the number of complete hexagons is increased. Similarly, in the case of three of the complete hexagons shown, each side of the closed figure is formed by a pair of selection lines, one from each of two different groups, and that every side is formed by parts of a different pair of selection lines. The switching cells are formed on these sides, which include two co-acting selection lines and it follows that each cell of the array may be uniquely selected by the selection of the appropriate pair of selection lines. It will be appreciated that as more hexagons are completed by the addition of further selection lines, so more of the completed figures will have pairs of co-acting selection lines on all sides and, in consequence, more switching cells are rendered effective.

In a practical case, therefore, where there may be a considerable number of selection lines in each group, it will be appreciated that the packing density of switching cells along the lines has been considerably improved, since, except for the edges of the array, all the adjacent linear portions of all the conductors are effective in controlling switching cells. Moreover, the arrangement shown avoids the complications associated with the requirement for reversing the polarity of selection currents within a group as noted earlier.

It will be realised that the co-acting pairs of selection lines as shown in the drawing are spaced apart for the sake of clarity in order to show the paths followed by selection conductors through the array. In practice, of course, the lines are preferably formed by strip-line conductors formed, for example, by deposition on to suitable insulating layers. Under these conditions it will be appreciated that the parallel lines may actually be superimposed.

A practical example of the use of a superimposed conductor pattern is shown diagrammatically in FIGURE 3, as applied to a superconducting storage arrangement. In this arrangement each storage cell is switched to represent the storage of an item of information, by the application of drive currents to a pair of parallel conductors. The individual storage cells are similar to those referred to as "two-hole memory cells," in the article by L. L. Burns, Jr., referred to earlier. It has been found that the operation of the storage cell using parallel conductors and a continuous superconducting ground plane is somewhat similar to the crossed conductor form of cell as described by Burns in the latter part of this article, so that the formation of holes in the ground plane is not required. However, the manner in which the storage cells operate forms no part of the present invention and the detailed operation of the cells will not be further described. As shown in the figure, the selection lines consist of three groups of lead conductors 10, 11 and 12 respectively, separated by layers 13 and 14 of insulating material, such as silicon monoxide. The lines are separated from a tin ground plane 15 by a further insulating layer 16. Another layer of insulation 17 separates the ground plane 15 from a lead sense conductor 18, which is linked to all the storage cells, and the whole arrangement is supported on a glass substrate 19. It will be realised that the figure is intended only to show the relative positions of the various parts of the apparatus and does not purport to indicate the actual or relative dimensions of the parts. It will be seen, however, that the conductors 10, 11, 12 are each formed of linear portions and that taken together the conductors are overlaid to form the hexagonal pattern shown in FIGURE 1, the closed hexagonal figures being indicated by dotted lines 20.

In one mode of operation, as indicated in the figure, one end of each of the conductors 10, 11, 12 is connected in common by a connection 21 to ground. A particular storage cell is selected by a specified address applied to an address decoder 22. This kind of selection by address is well-known in the electronic computer art and need not be further particularized herein. The decoder 22 decodes the address and applies control signals over lines 23 to activate selectors 24, one of which is provided for each group of lines 10, 11 and 12 respectively. Each of the selectors 24 includes a pulse generator for each line of the associated group and the lines of the particular pair, one line from each of two different groups, associated with the required storage cell are energised by a drive current pulse to actuate the selected cell.

The sense line 18 is connected to a suitable output amplifier 34 in the conventional manner.

The arrangement shown in FIGURES 1 and 3 requires three groups of mutually interacting selection lines. However, it will be appreciated that more than three groups of lines may be used. It will also be appreciated that the pattern formed by the selection lines over the array of cells may include other rectilinear geometrical figures than hexagons and that the figures so formed need not all be the same. For example, FIGURE 2 shows a pattern which includes four and five-sided figures, and in which four groups of selection lines 5–8 are used. As in the previous cases, it will be seen that each selection line consists of a series of linear portions and that each such portion of any one selection line, within the pattern of complete geometrical figures, lies parallel with a linear portion of a different selection line from another group. Once again the storage or switching cells 9 of the matrix are arranged so that they lie adjacent the sides of the figures and it will be observed that there is a switching cell 9 for each linear portion of each selection line within the pattern.

As in the previous case, it will be realized that the selection lines shown are representative only of the paths followed by suitable selection conductors across the matrix of cells and are not to be taken as indicative of actual size or scale of such conductors relative to the pattern shown. The actual sizes and methods of producing such conductors are similar to the sizes and methods previously proposed in connection with the well-known two-group selection systems.

The foregoing matrix selection arrangements have been described with reference to selection line patterns for use with cryogenic switching devices which may also include storage devices. It will be realised, however, that similar arrangements may also be used in association with other switching devices. For example, electro-optical switching devices are similarly controlled by pairs of selecting lines. An electro-optical switching device of this kind may consist, for example, of a barium titanate crystal with selection and control electrodes deposited on opposite faces. The application of electrical signals to the electrodes is used for the selective control of the optical properties of the light switching cells. In such a case, because a pair of conductors are required to be on opposite faces of the crystal, duplication of the pattern of at least one group of selection lines is required in order to select such switching cells in a matrix. For example, if a planar matrix of such cells is to be selectively operated by, say three mutually interacting groups of selection conductors A, B, and C then the groups A and C are deposited on one side of the matrix and groups B and C are deposited on the other side to ensure that all the cells may be selected individually and uniquely. The selection line pattern is then complete, as shown for example, in FIGURE 1, if the patterns on both sides of the matrix are considered together. Hence, the term "electrical switching matrix" as used herein is intended to include any planar matrix of suitable switching cells in which a single cell is selected and controlled by the application of electrical signals to a pair of selection lines or conductors, which conductors are arranged in close proximity to the selected cell and which extend parallel to each other in a direction parallel to the plane of the matrix.

In the preceding examples of conductor patterns, it has been assumed that the particular pair of parallel selection lines associated with a single cell are superimposed. However, it will be realised that under certain circumstances, the lines of a parallel pair may be spaced apart on, say, one face of a planar matrix so that the effective switching cell lines between them. An example of this kind of arrangement is illustrated diagrammatically in FIGURE 4, which shows only a part of a conductor pattern. The arrangement shown in FIGURE 4 has three mutually interacting groups of conductors, 25, 26 and 27, respectively, termed the X-, Y- and Z-selection lines, and the conductors of these groups correspond to those of the groups shown in FIGURES 1 and 3. However, the conductor groups are displaced relative to each other so that the parts of lines associated with a single cell are spaced apart. In this case the switching cells lie between their respective conductors and one such cell is indicated by the shaded area 28 in the figure. Such a cell is described in United States Patent No. 3,027,806, with particular reference to FIGURE 5B therein. In this example the conductors are applied to a crystal 29 of barium titanate, for example. Crossing points of conductors in the pattern are separated by a layer of insulation 30. The application of suitable signals to the co-acting pair of conductors of a selected cell is effective to create an electrical field acting on the cell, thus rendering the cell effective to rotate the plane of polarization of incident light applied to the face of the crystal. As described in the United States Specification referred to, this arrangement of a crystal is particularly useful in relation to optical scanning or storage devices, in which the crystal is interposed in a light transmission path which also includes polarizing elements and an optical information storage plate. The selection of a single cell then modifies the character of the light transmission path at this position and allows the storage plate to be interrogated or scanned, a photoelectric sensing device then being employed to detect the passage of light through the apparatus.

The selection of a cell is performed in a somewhat similar manner to that described in relation to FIGURE 3. Each group of selection lines is connected to selection switch networks 31, which are actuated by a decoding network 32 to select the required pair of lines to be actuated. A driver 33, which consists of an electrical pulse generator is connected to the switching networks 31, to provide the requisite electrical signal on the selected lines.

It will be realise from the foregoing examples that the arrangement of matrix selection lines in the patterns described provides a selection arrangement in which at least three mutually interacting groups of lines each comprise individual lines consisting of a series of linear portions, each of the portions lying at an angle with respect to the adjacent portions of the same line. The combined effect of all the conductors in the groups is to produce a pattern of rectilinear geometrical figures, and the switching cells are formed adjacent to the sides of the figures by the co-operation of that pair of lines forming the side. In order to select an individual cell, the pattern is such that any cell is actuated by a different pair of lines, one from each of two different groups, and no two cells are actuated by the same selection line pair.

What is claimed is:

1. An electrical switching matrix including an array of electrical switching cells; at least three mutually interacting groups of selection lines arranged to form a pattern over the cells, said pattern having a plurality of closed rectilinear geometrical figures, the sides of the figures each lying adjacent a different switching cell, the lines in the pattern being arranged so that two co-acting selection lines respectively from different groups lie in substantially parallel relationship along each one of said sides, each of said cells being switchable in response to an electrical signal applied to both lines in the adjacent side; and means for applying electrical signals selectively to the selection lines of the groups to switch individual cells.

2. An electrical switching matrix including a plurality of electrical switching cells; at least three groups of selection lines arranged in a pattern over said cells, said pattern comprising a plurality of closed rectilinear geometrical figures, the sides of the figures being formed from portions of said selecting lines, each side including parallel portions of two lines respectively from different groups and each of said sides lying adjacent and co-acting with a different one of said switching cells, no two cells lying adjacent portions of the same two selection lines; and means for applying an electrical signal to each of two of said selection lines, one from each of two different groups respectively, to select a single switching cell.

3. An electrical switching matrix including a plurality of electrical switching cells each operable by a resultant field produced by electrical energization of an associated pair of selection lines; at least three groups of selection lines, each group including a plurality of individual lines following substantially parallel mean paths over the switching cells, each line having an effective length comprising a series of adjacent linear portions lying at an angle to each other, the lines of all the groups taken together forming a pattern in which said linear portions lie parallel to the sides of a plurality of closed rectilinear geometrical figures, the disposition of the pattern relative to the switching cells being such that each switching cell lies adjacent a different one of said sides, the arrangement of the individual lines in the pattern being such that two linear portions of selection lines from different groups respectively lie parallel to each of said sides, and portions of the same pair of selection lines lie parallel to only one of said sides; and means for selectively energising the selection lines of the groups.

4. An electrical switching matrix including a sheet of material having switching properties in dependence upon fields produced by electrical energization of adjacent electrical conductors; at least three groups of mutually insulated selection conductors applied to said sheet, each group including a plurality of individual conductors each having an effective length comprising a series of adjacent linear portions lying at an angle to each other, all the conductors taken together forming a pattern over said sheet in which said linear portions lie parallel to the sides of a plurality of closed rectilinear geometrical figures, the arrangement of the individual lines in the pattern being such that two linear portions of conductors from different groups respectively lie parallel to each of said sides and portions of the same pair of conductors lie parallel to only one of said sides; and means for selectively electrically energising the conductors to produce selected switching cells each associated with a different one of said sides.

5. An electrical switching matrix including a substrate; a film of material thereon having switching properties in dependence upon fields produced by electrical energization of adjacent conductors; at least three groups of mutually insulated conductors laid over said film, each group including a plurality of individual conductors having an effective length comprising a series of adjacent linear portions lying at an angle to each other, all the conductors together forming a pattern over said film consisting of a plurality of closed rectilinear geometrical figures, the sides of the figures each being formed by overlaid linear portions of two different conductors, portions of the same pair of conductors forming only one of said sides; and means for selectively electrically energising a pair of conductors respectively from different groups to produce a resultant electrical field effective to produce a switching operation in the material of the film adjacent only a selected one of said sides.

6. An electrical switching matrix including a planar substrate; a film of material having switching properties supported by said substrate, the switching properties of said film being such that an individual switching cell is produced in the film by a resultant field produced by concurrent electrical energization of a pair of parallel electrical conductors; a plurality of electrical conductors laid over said film and electrically insulated therefrom and from each other, said conductors taken together forming a pattern of closed rectilinear geometrical figures having sides each formed by portions of two overlaid conductors, the same two conductors together overlying only one side of one figure within the pattern, each conductor having a succession of linear portions along its length, each two adjoining portions in the succession lying along two adjacent sides of a figure; means for selectively concurrently energizing a pair of conductors to produce a resultant field acting on the film adjacent only one side of a figure to produce and actuate a switching cell at that side of a figure formed by the overlaid portions of the selected pair of conductors; and means for reading out a signal indicative of the actuation of a cell so produced.

References Cited

FOREIGN PATENTS 973,609  10/1964  Great Britain.

JOHN W. CALDWELL, *Primary Examiner.*

D. J. YUSKO, *Assistant Examiner.*